(12) United States Patent
Ignatan et al.

(10) Patent No.: US 8,333,329 B2
(45) Date of Patent: Dec. 18, 2012

(54) ATOMIZING DESUPERHEATER SHUTOFF APPARATUS AND METHOD

(75) Inventors: Veaceslav Ignatan, Erie, PA (US); Robert L. Fetterman, Lake City, PA (US)

(73) Assignee: SPX Corporation, Charlotte, NC (US)

( * ) Notice: Subject to any disclaimer, the term of this patent is extended or adjusted under 35 U.S.C. 154(b) by 774 days.

(21) Appl. No.: 12/488,024

(22) Filed: Jun. 19, 2009

(65) Prior Publication Data
US 2010/0319781 A1 Dec. 23, 2010

(51) Int. Cl.
*G05D 23/13* (2006.01)
*B01D 47/06* (2006.01)
*B01F 5/04* (2006.01)

(52) U.S. Cl. ...................... 236/12.14; 261/115; 261/118; 137/897

(58) Field of Classification Search ............... 236/12.14; 137/2, 897; 261/62, 66, 115, 118
See application file for complete search history.

(56) References Cited

U.S. PATENT DOCUMENTS

| | | | | |
|---|---|---|---|---|
| 3,904,722 A * | 9/1975 | Onoda et al. | ................. | 261/64.1 |
| 4,442,047 A * | 4/1984 | Johnson | ........................ | 261/66 |
| 5,607,626 A * | 3/1997 | Kunkle et al. | ................... | 261/27 |
| 5,743,638 A * | 4/1998 | Cummins et al. | .......... | 366/163.2 |
| 2002/0179739 A1* | 12/2002 | Kunkle et al. | ................. | 239/453 |

OTHER PUBLICATIONS

International Search Report for International Application No. PCT/US2010/039026 dated Aug. 11, 2010.

\* cited by examiner

*Primary Examiner* — Chen Wen Jiang
(74) *Attorney, Agent, or Firm* — Baker & Hostetler LLP

(57) ABSTRACT

The present invention is directed to a desuperheater spraying valve assembly. More particularly, the invention provides a new and improved valve assembly, whereby cooling liquid may be controllably injected into a gas or a liquid stream, typically steam, to selectively maintain the gas or liquid at a predetermined temperature level. In a possible embodiment of the present invention, a class V valve assembly is disclosed. It comprises an actuator coupled to a plug with a valve seat in the proximity of said plug. The plug is affixed to an actuator rod which transverses the body of the valve assembly. A spray tube may be affixed to said valve seat and at least one spray nozzle is affixed to a to the spray tube. The plug and said valve seat are conical in shape as to when said plug is inserted into said valve, they form a seal.

19 Claims, 8 Drawing Sheets

ATOMIZING DESUPERHEATER SHUTOFF APPARATUS AND METHOD

BACKGROUND OF THE INVENTION

The present invention is directed to a spray desuperheater apparatus and method. More particularly, the present invention is directed to an improved desuperheater valve assembly, which may have a plurality of nozzles affixed to the spray assembly. The aforementioned assembly allows for the controlled injection of a cooling liquid into a superheated fluid to selectively reduce the temperature of the superheated fluid and maintain the downstream flow at a predetermined temperature level.

Superheated fluid is fluid that is at a temperature that is higher than the boiling point of the fluid. Many industrial applications operate most efficiently using a fluid that is saturated or only slightly superheated, but many fluid generators tend to produce a fluid that is excessively superheated. Excessive temperatures (superheat) may damage system components, adversely affect the efficiency of operation or quality of the product being manufactured. The process of injecting a controlled amount of coolant to reduce the temperature of the superheated medium to a specific and precise temperature is defined as desuperheating. Also superheated steam excessive thermal energy can cause damage to the utilizing devices or processes, making it necessary to rigidly control and maintain the steam temperature. Steam desuperheating refers to the process of reducing and controlling the temperature of the superheated steam by introduction of cooling water into the steam flow.

A common method to desuperheat steam is by spraying or injecting a cooling liquid into the flow of superheated steam while it is passing through a steam pipe or the like. Once the cooling liquid is sprayed into the superheated steam flow, water droplets are formed. The droplets rapidly mix with the superheated steam and evaporates, drawing thermal energy away from the steam and thus regulating its temperature. Droplet sizes and spray pattern are among the main parameters, which determine desuperheating efficiency. Thus it is important to utilize a spray nozzle that allows for the injection of a cooling fluid into the processed steam or any superheated fluid the smallest available droplets with optimum spray patterns and additional mixing control capability.

Because the amount of superheat varies with the amount of steam production the most accurate regulation can be made by sensing the temperature of the steam at a point downstream where the injected water has been completely vaporized and heated so that equilibrium conditions have been reached. Conventionally this would require a spray nozzle that is optimized for a very narrow coolant flow rate, and if the flow rate is varied outside of certain parameters, the resulting spray pattern may not give prompt enough heat transfer to allow an equilibrium condition to be sensed and proper steam conditions be attained. However, spring-loaded nozzles allow to eliminate this problem.

An important aspect of desuperheating steam or any gas, is a valve's ability to control the flow of cooling liquid being injected into the superheated steam or any gas. The main control element of a valve is a trim, which usually comprised of three components, a plug, cage, and a seat. In a plug throttling trim types, the plug has a contour on its lower end, below the seat. The contoured portion provides varying flow area with lift, thus regulating the flow. The flow characteristic of the trim varies according to the profile of the plug. Thus, having control valve as a separate unit adds installation and maintenance cost for a desuperheater user.

Due to the service locations, there are more strict requirements for leak tightness for desuperheater coolant control valves in the closed position. If the valve were to leak when the desuperheating was not needed, the unrequited cooling of the steam may cause damage or impede the performance of equipment using the steam. The ANSI/FCI 70-2 (American National Standards Institute/Fluid Controls Institute) standard establishes a series of seat leakage classes for control valves. Class V is usually specified for the desuperheater coolant control valves. It is the most restrictive leakage class for metal-to-metal trim design.

A power positioning actuator is required for kipping the valve fully closed and moving the valve closure membrane, plug, to any position in response to a signal of a temperature control system. The flow over the seat with unbalanced plug design utilizes the valve inlet pressure to assist closure of the valve, which significantly reduces required force from the actuator to provide tight seat leakage shutoff.

To effect movement of the aforementioned plug, which is located inside a valve, there needs to be a transfer of motion from a power positioning actuator to the valve's plug through the body of the valve. The valve may contain liquid at a high pressure and the having a hole in the valve's body to transfer motion to the plug via a stem may enable leaking at the place where the stem goes through the body of the valve. One way to prevent leaks is to employ a stuffing box. A stuffing box may be a gland seal or the like, used to seal the reciprocating stem from the fluid.

Additionally, it would desirable to have a replaceable seat ring with a modular design which would permit multiple configurations which can be assembled with a minimum number of unique components. This will increase profit margins, reduce the end user part replacement costs for repair and maintenance activities. It would also be desirable to employ more durable materials to increase the service life and provide a wider range of capacity.

Thus, it would be desirable to integrate the cooling liquid control valve into the desuperheater apparatus to reduce costs by eliminating the need of a separate cooling liquid control valve and its corresponding conduit assemblies. It would also be desirable to restrict the coolant leakage to meet the ANSI/FCI 70-2 class V classification characteristics.

SUMMARY OF THE INVENTION

The present invention is directed to a spray desuperheater. More particularly, the invention provides a new and improved spray tube assembly which may having a plurality of nozzles, whereby liquid coolant may be controllably injected into a gas or a superheated fluid, typically steam, to selectively maintain the fluid at a predetermined temperature level.

In a possible embodiment of the present invention, a Mechanical Atomizing Desuperheater with Class V Shutoff (MADV) introduces liquid coolant into a superheated medium. The MADV is a probe style direct contact heat exchanger that combines a flow control element (trim) and a spray tube with spring-loaded injection nozzles. The flow control element modulates the coolant flow using a top guided plug-throttling trim, which is configured to provide the required flow control characteristics. The trim is comprised of two components, a top guided plug and a seat ring. The plug has a contour on its lower end, below the seat. The contoured portion of the plug defines flow characteristic, by varying flow area relative to the plug position. The plug is guided by replaceable guide insert that is press-fitted into the upper part of the MADV body. Throttling occurs between the contoured portion of the plug and the seat ring bore. The seat ring is mounted at the top of the spray tube.

Prior art Multi-nozzle spray desuperheaters and spring assisted multi-nozzle desuperheaters both have an internal flow control element, which is located at the highest temperature zone of the desuperheater. The resulting high thermal stresses and different thermal expansions of the internal parts create the potential for accelerated operational failures and/or premature wear of internal parts. The present invention resolves this problem by locating the trim outside of highest temperature zone. A series of injection nozzles are fitted to the end of the spray tube to complete the assembly and this assembly is inserted through the header connection. In addition, current embodiments have the MADV's nozzles also have a higher capacity and more robust design than the nozzles used in the multi-nozzle spray and spring assisted multi-nozzle desuperheaters. The replaceable seat ring and modular design of the MADV permits multiple configurations to be assembled with a minimum number of unique components to increase margins, reduce end user part replacement cost for maintenance activities, enable the use of more durable materials to increase the service life, and provide a wider range of capacity.

Each injection nozzle is an assembly that consists of a spring-loaded plunger that is located in a cylindrical housing with a central cylindrical cavity having a fluid inlet and a fluid outlet. The injection nozzle also has a plunger inserted into the fluid outlet of the housing so that the plunger and the housing form a fluid path. A plunger stop is attached to the housing at the fluid inlet. A spring retainer is attached to the plunger. At least one spring is disposed between the housing and spring retainer.

Additionally, the replaceable seat ring and modular design of the MADV permits multiple configurations to be assembled with a minimum number of unique components which will increase margins, reduce end user part replacement cost for maintenance activities, enable the use of more durable materials to increase the service life, and provide a wider range of capacity.

A method for desuperheating steam in a steam pipe utilizing a Seat Leakage Class V valve assembly is disclosed as another possible embodiment. The method comprises detecting a temperature of steam in a steam pipe and sending the temperature to a controller. The controller then sends a control signal to a valve actuator coupled to a plug inside a valve. The valve actuator positions said plug proximate to a valve seat inside the valve to increase or decrease a flow rate of a cooling traversing through said valve. The cooling liquid is then sprayed with a spray nozzle into a steam pipe to perform desuperheating.

In an additional possible embodiment, a class V desuperheater system is disclosed. The system comprises a means for detecting for a temperature of steam in a conduit carrying a liquid or a gas and a means to send said temperature to a controller. A means to control sends a control signal to a valve actuator coupled to a plug inside a valve, which positions said plug proximate to a valve seat inside said valve to increase or decrease a flow rate of a coolant traversing through said valve. A spraying means to spray said liquid coolant with a spray nozzle into said gas or liquid conduit to perform desuperheating.

DETAILED DESCRIPTION OF THE INVENTION

Figure 1:
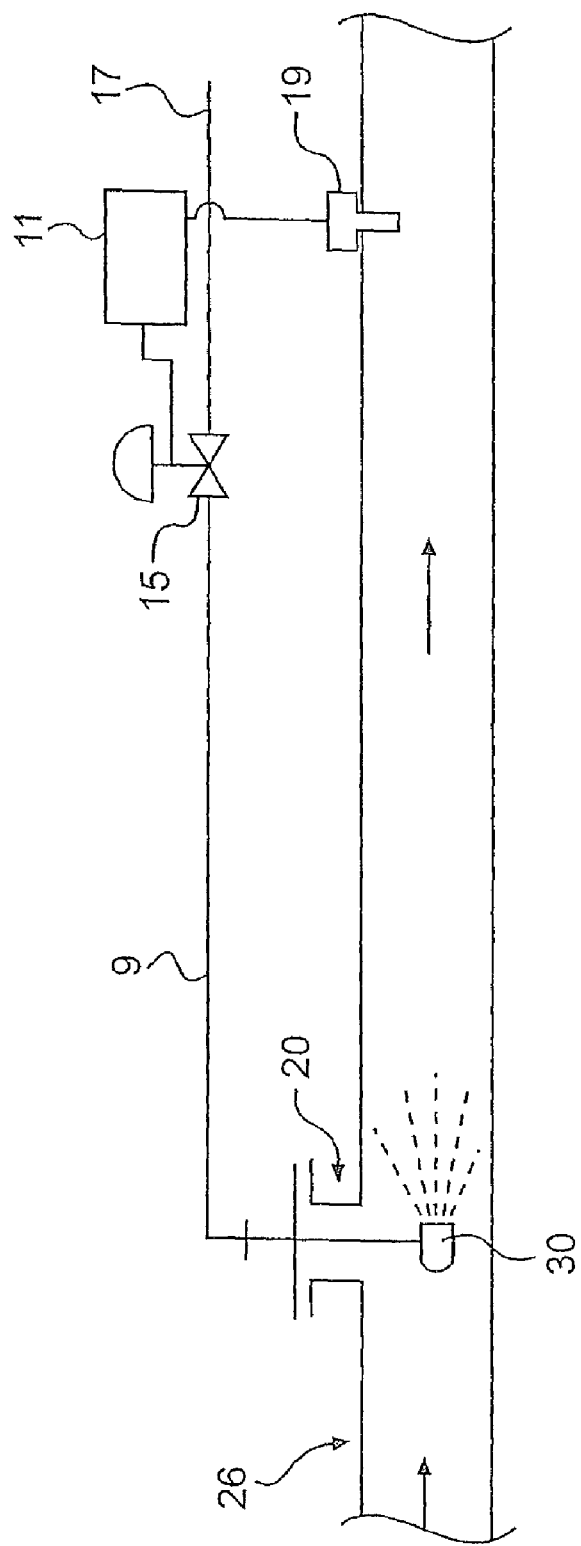
FIG. 1 is a schematic view of a steam line incorporating of a prior art desuperheater apparatus.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

There has thus been outlined, rather broadly, certain embodiments of the invention in order that the detailed description herein may be better understood, and in order that the present contribution to the art may be better appreciated. There are, of course, additional embodiments of the invention that will be described below and which will form the subject matter of the claims appended hereto.

In this respect, before explaining at least one embodiment of the present invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Desuperheaters are commonly used to cool steam or vaporized water, but the present invention may be deployed in piping or conduits carrying gases. Referring now to the drawings in greater detail and specifically to FIG. 1, a schematic arrangement of a prior art superdeheater. As illustrated, on the inlet a portion of a gas or liquid conduit 26, a flanged mounting fitting 20 is provided on the sidewall and a injection nozzle 30 is mounted inside the gas or liquid conduit 26 and is supplied with cooling liquid. The cooling liquid is under pressure and is supplied with said cooling liquid from a liquid supply line 17. Also, depicted is a control valve assembly 15 which operates to control the flow of liquid to the injection nozzle 30. The injection nozzle 30 controls the flow of cooling liquid which is atomized and injected into the liquid coolant line 9. The cooling liquid flow is a function in response to a temperature sensor 19, mounted in the gas or liquid conduit 26 spaced a distance downstream from the injection nozzle 30. The temperature sensor 19 functions to send a temperature measurement signals to a temperature controller 11, which evaluates the temperature against a desired set point and sends a corrective signal to the control valve assembly 15 to either restrict or increase the flow of the cooling liquid. Preferably, the distance between the temperature sensor 19 and the injection nozzle 30 is distance sufficient to allow the steam to come to equilibrium after the liquid has been injected in the stream to ensure a true measurement of the steams thermal energy. Thus, the control valve assembly 15, operates to vary the water flow in the liquid coolant line 9, which in turn modulates the amount of liquid sprayed into the gas or liquid conduit 26.

Figure 2:
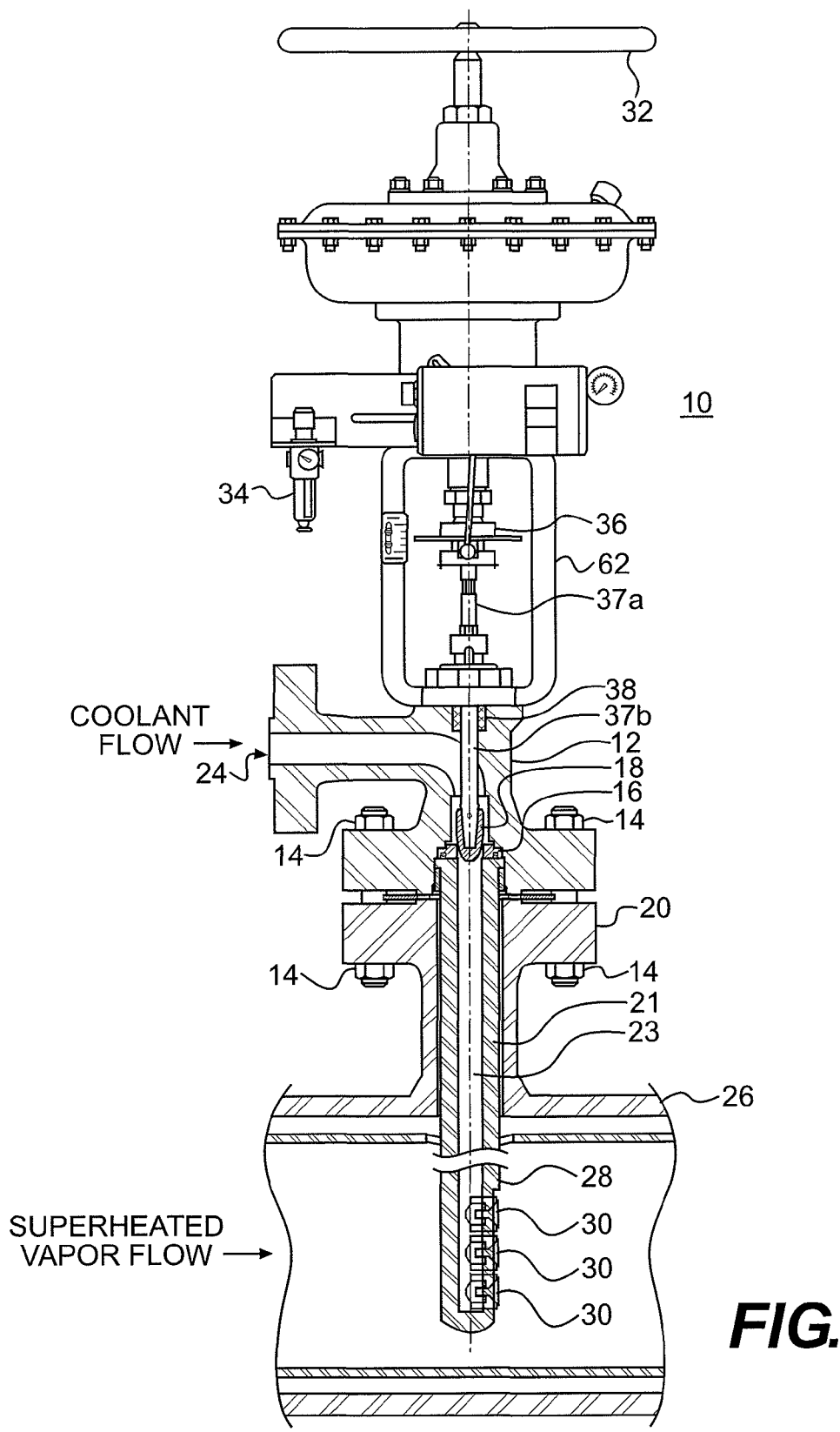
FIG. 2 illustrates a cross sectional view of an embodiment of a desuperheater apparatus in accordance with the present invention.

In the present embodiments, the control valve assembly 15 is incorporated into the body of the Desuperheater, as show in FIGS. 2-6. Continuing with FIGS. 2-4, each depicts a cross sectional close-up view of an embodiment of the present invention. More specifically, turning to FIG. 2, a gas or liquid conduit 26 incorporating the Mechanical Atomizing Desuperheater (MADV) apparatus unit 10, in accordance with an embodiment of the present invention is illustrated. FIG. 2 depicts the gas or liquid conduit 26, wherein a flanged mounting fitting 20 is mounted on the sidewall of the gas or liquid conduit 26. As illustrated, the main body 12 of the MADV apparatus unit 10 is attached to the flanged mounting fitting 20 with via mechanical connection, for example, mounting bolts 14. An attached liquid coolant inlet 24 is a flange type connector. A first end of a spray tube 21 is fitted at the outlet of the main body 12. The second end of the spray tube 21 has a spray unit 28 affixed to it. The spray unit 28 has a at least one injection nozzle 30 for atomizing the liquid coolant into the gas or liquid conduit 26.

In an embodiment of the present invention, the main body 12, can be constructed from varying materials including carbon steel, wherein the main alloying constituent is carbon. The main body 12 may be cast, forged or machined in the desired dimensions and geometry. Also, depending upon the pressure and temperature requirements where the valve will be deployed, the choice of material can vary in composition of alternative carbon steel formulations, such as WC6, WC12, WC12A or any other suitable metal, alloy or plastic.

Figure 2A:
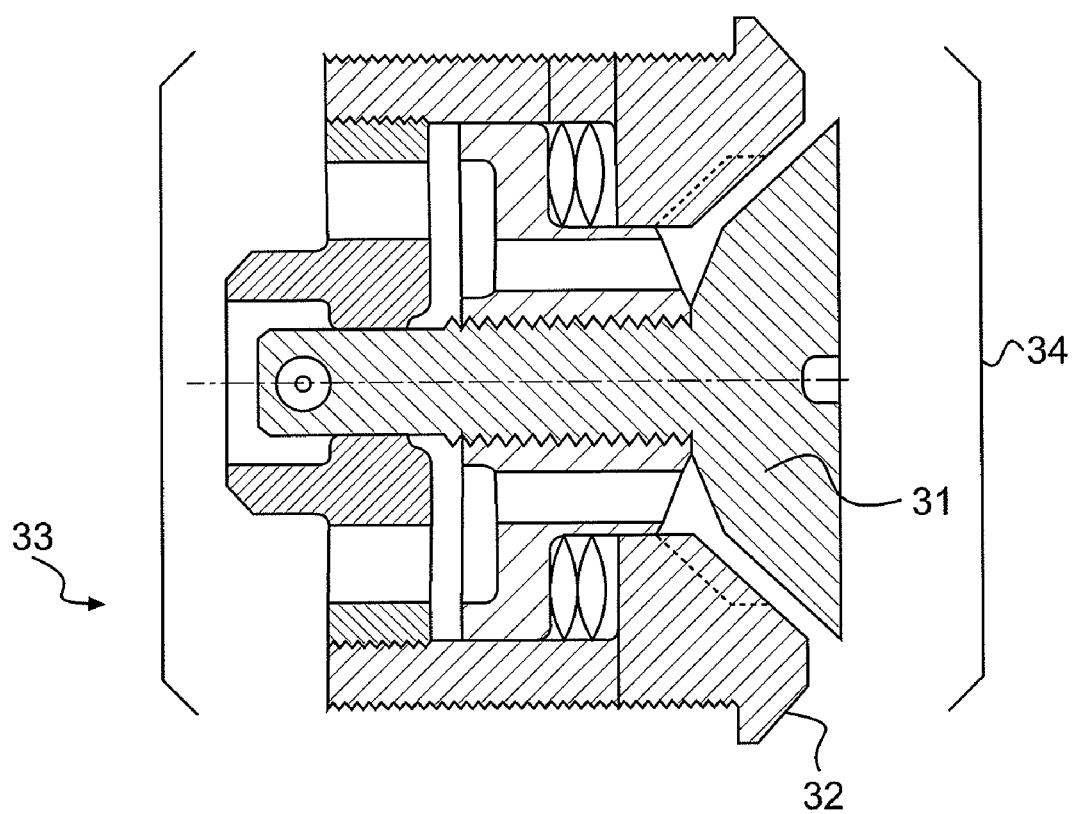
FIG. 2a illustrates may be an example of the composition on the injection nozzle of a desuperheater apparatus in accordance with the present invention.
Figure 3:
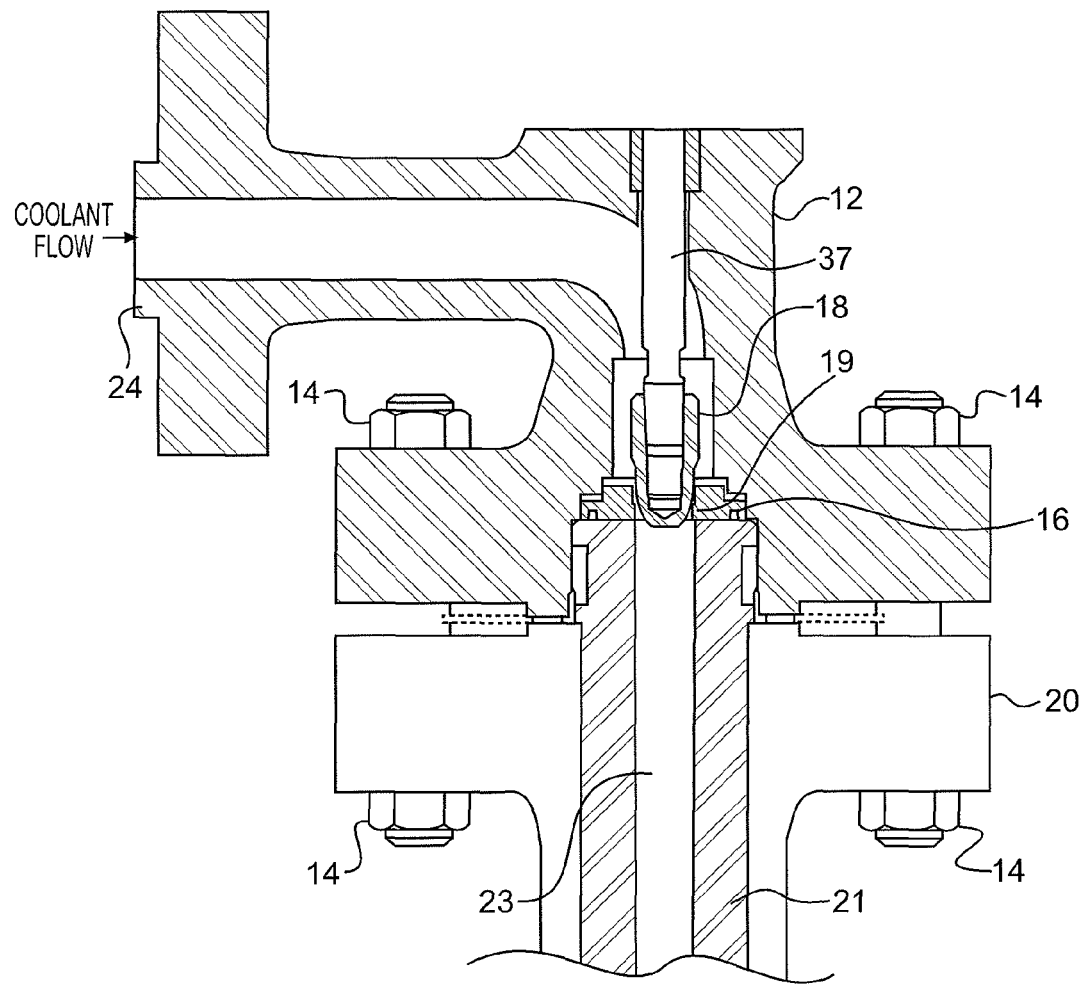
FIG. 3. is an enlarged view of the desuperheater apparatus of the present invention in the closed position.

Turning now to FIG. 2a, may be an example of the composition on the injection nozzle 30 and it may comprise an assembly comprising of a spring-loaded plunger 31 that is retained in a cylindrical housing 32 having a central cylindrical cavity. As illustrated, each nozzle 30 has a fluid inlet 33 and a fluid outlet 34. The injection nozzle 30 also has a plunger inserted into the fluid outlet of the housing so that the plunger and the housing form a fluid path. Each injection nozzle 30 further includes a plunger stop which is attached to the housing at the fluid inlet. A spring retainer is attached to the plunger and functions to close the injection nozzle when no fluid under pressure is present.

Figure 4:
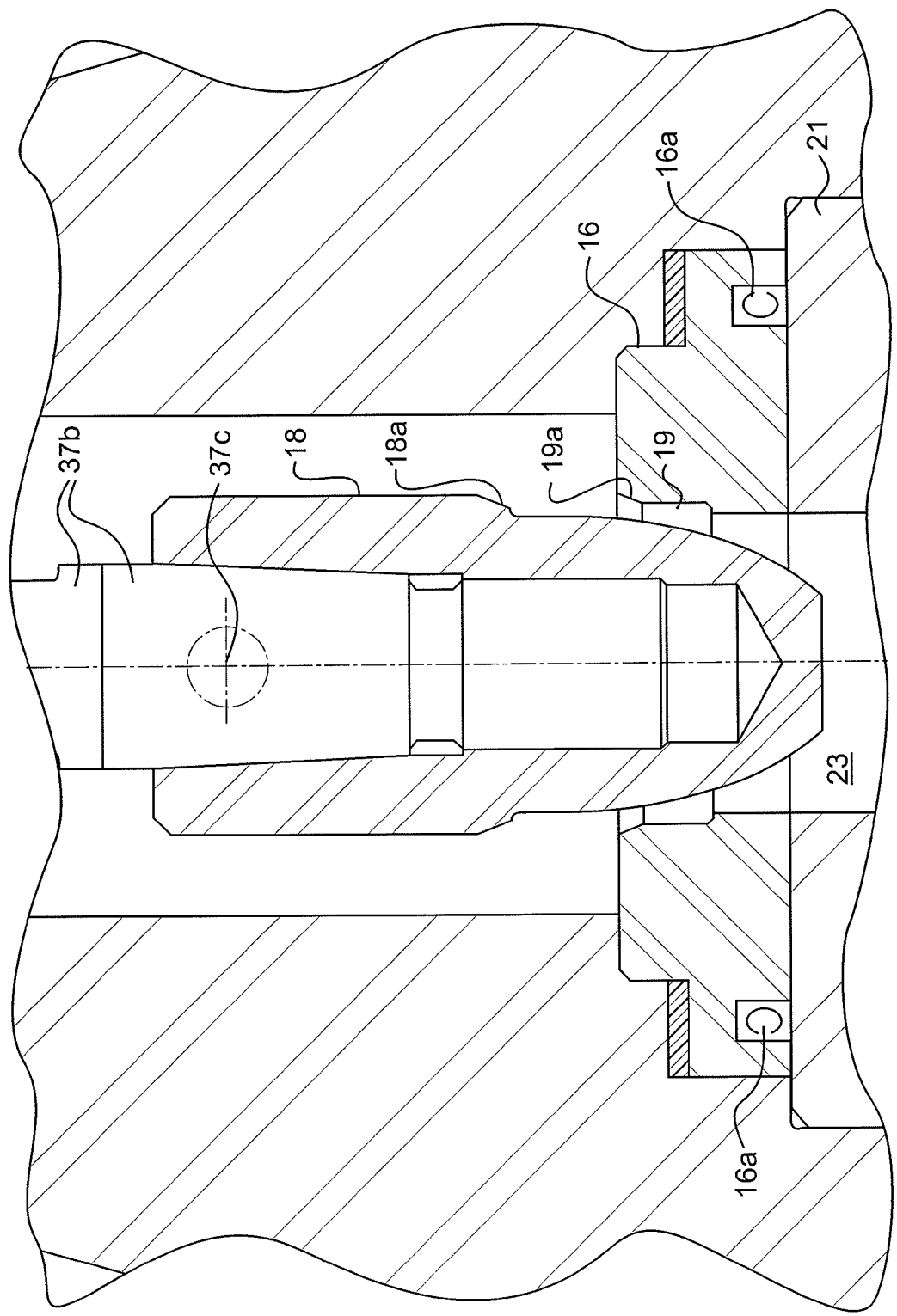
FIG. 4 is a side view of a plug employed in the valve of a desuperheater apparatus of the present invention.

Now referring to FIG. 4, a cross sectional view of plug which be deployed in accordance with one non-limiting embodiment is illustrated. The plug 18 is attached to a valve stem 37b and is held in place with a pin 37c. The plug 18 has a mostly conical shape. As depicted in FIG. 2, the other side of the valve stem 37b is attached to an actuator control rod 37a. Referring back to FIG. 2, the other side of the actuator control rod 37a is connected to a pneumatic valve actuator 36. The pneumatic valve actuator 36 moves the plug 18 to a various position based upon control instructions provided by the temperature controller 11. The aforementioned translation and positioning of the plug is accomplished via the linkage assembly that is formed between the actuator control rod 37a and the valve stem 37b. The plug 18 is positioned above and inside a valve seat 16. The shape of the valve seat 16 is also mostly conical in shape having its minor frustrum near the valve's outlet and its major frustrum inside the body of the valve. The plug 18 and valve seat 16 can be any shape as long as they are similar. For example, the plug may be a block and the valve seat may be an corresponding square, and when the block is "seated" on the valve seat, the flow through the valve is restricted.

In one preferred embodiment, the plug 18 may be made out of soft annealed type 420 Stainless Steel. This alloy provides both outstanding corrosion resistance and exceptional wear resistance. It is also known as cutlery grade martensitic stainless steel. The valve seat 16 can also be made out of this material. Alternatively, the plug 18 and the valve seat 16, may be manufactured from other materials, such as carbon steel, Stellite (cobalt-chromium alloys), brass, beryllium-copper or any heat durable corrosion resistant metal or alloy.

As illustrated in FIG. 4, the valve seat 16 is fitted next to the spray tube 21. Also as illustrated, C-ring 16a is positioned between the seat ring 16 and the spray tube 21 to ensure a leak proof seal. The C-ring is essentially a metal O-ring with an open side. In contrast to a O-ring, the C-ring requires approximately one-half of the load of an O-ring with little change in leak rate over its compression. This results in joints with less sensitivity to flange displacement, while retaining the required pressure and temperature characteristics of the O-ring. The C-ring key may be constructed from varying materials, however, one preferred embodiment, for example, one preferred material is a high-duty alloy such as Alloy 718, which is a nickel-chromium-iron-molybdenum with the addition of niobium to permit age-hardening.

As previously discussed the plug 18 modulates the flow of coolant through the valve assembly by changing the positioning of the valve stem 37b. One embodiment of the MADV apparatus unit 10 encompassed by the present invention utilizes a pneumatically operated control valve actuator, however, electric, hydraulic, and manual actuators may also be utilized. Returning to FIG. 2, the pneumatic valve actuator 36 is a spring-and-diaphragm pneumatic actuator type and is depicted in accordance with an embodiment of the present invention. This type of pneumatic valve actuator 36 is oftentimes preferred due to its dependability and simplicity of design. Electric and electro-hydraulic actuators can be utilized with the present invention, for example, in environments where an no air supply source is not available, or having low ambient temperatures which could freeze condensed water in pneumatic actuators, or where unusually large stem forces are needed.

The plug 18 position relative to the valve seat 16 permits the actuator to modulates the coolant flow. For example, when the plug 18 is seated upon the valve seat 16, the coolant flow through the MADV apparatus unit 10 is nil. Additionally, as the plug 18 is moved away from the seat ring 16, the cooling liquid will start to flow. The shape of the plug 18 and the shape of the valve seat 16 are chosen to provide certain coolant flow characteristics. For example, the amount travel or stroke of the plug 18 can be directly proportional to the flow of the cooling liquid flowing to the spray tube 21. If the plug 18 of the MADV apparatus unit 10 is opened to three-quarters of the plug's travel distance (from a fully closed position), the flow rate through the MADV apparatus unit 10 will likely be 75% of the valve being fully opened.

Figure 7:
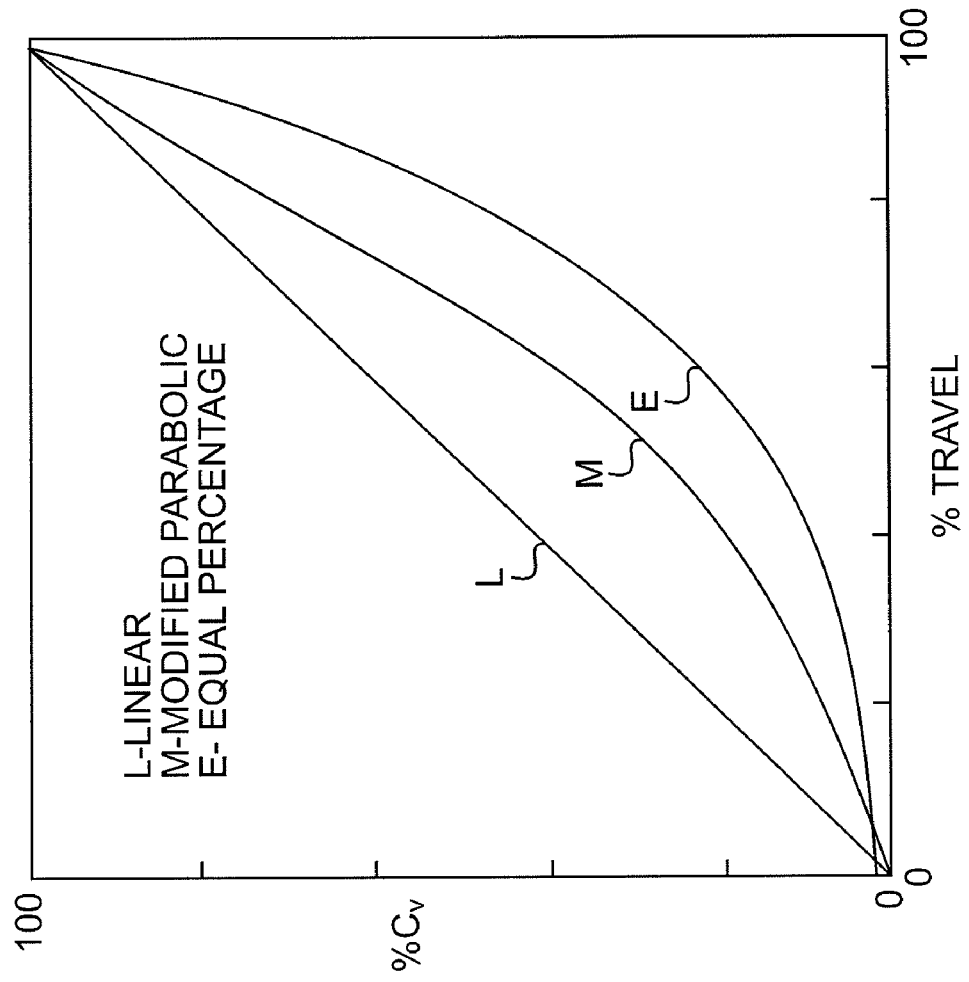
FIG. 7 is a graph illustrating three types of flow control characteristics of the present invention during operation.

Turning now to FIG. 7 is a graph illustrating three algebraic flow characteristics based upon the plug's 18 and valve seat's 16 geometries and dimensions. The percent of travel of the plug 18 is referenced on the x-axis, while the percent Cv is referenced on the y-axis. Cv is a measure for the flow of a valve and is defined as the volume of flow per unit of time. Cv may be calculated in U.S. gallons per minute (g.p.m.) of water at a temperature of 60° Fahrenheit with a pressure drop across the valve of 1 pound per square inch (p.s.i.) It can be calculated by formula (1)

$$Cv = g.p.m./\sqrt{fully\_open\_pressure\_drop} \qquad \text{formula (1)}$$

A linear plot "L" illustrates a possible linear relationship between the valve's flow to plug's 18 position within the valve. A modified parabolic plot "M" illustrates a possible modified parabolic relationship of the valve's flow to plug's 18 position within the valve and an equal percentage plot "E," illustrates a possible equal percentage relationship between the valve's flow to the plug's 18 position within the valve.

Figure 5:
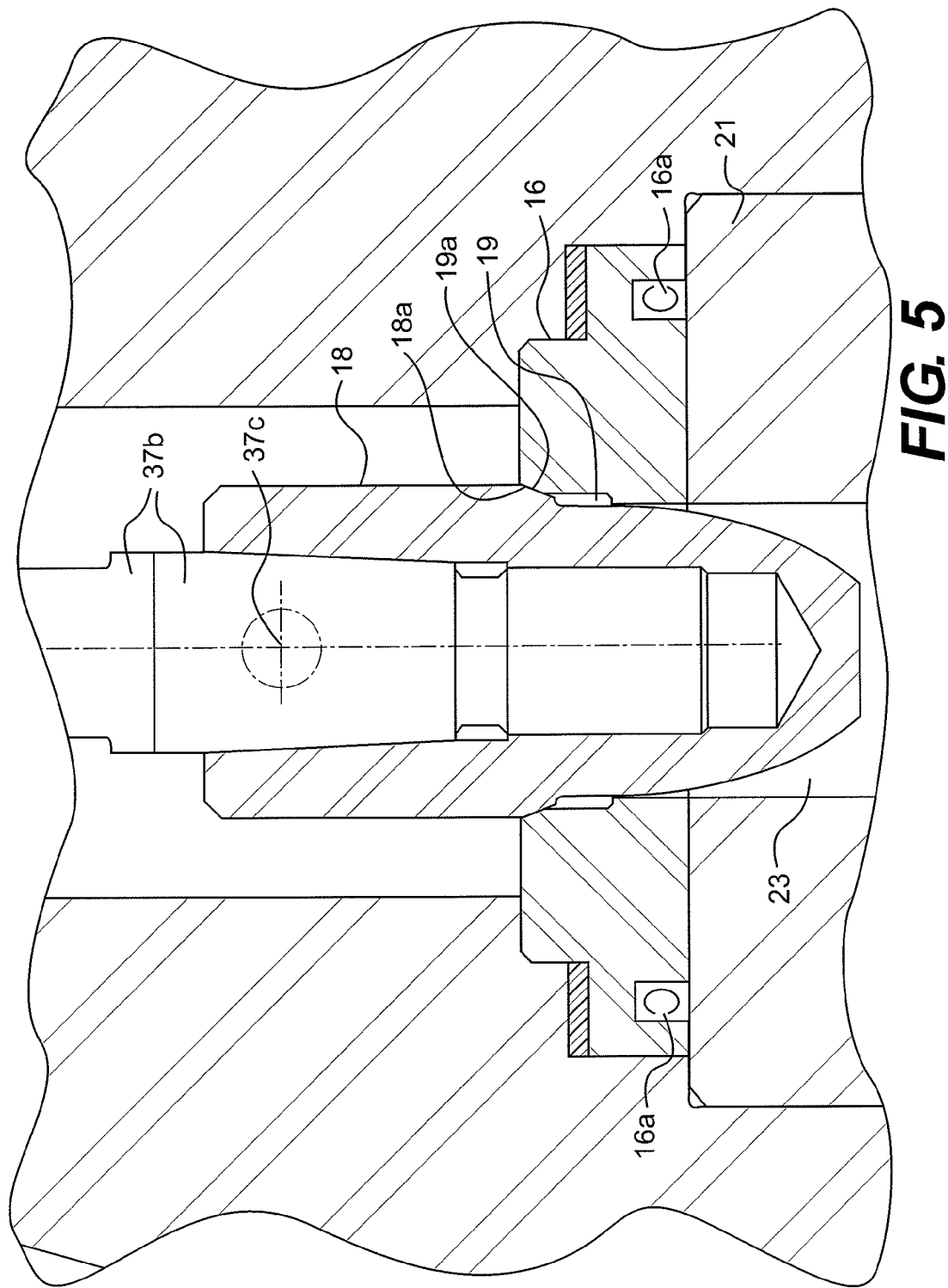
FIG. 5 is a cross sectional view showing a valve in the closed position in a desuperheater apparatus of the present invention.

During operation of the MADV apparatus unit 10, while in the full open position, the flow of the cooling liquid is at a maximum rate. As the valve is transitioned to the closed position, the plug 18 is translated towards the valve seat 16, decreasing the flow rate of the cooling liquid. Once the plug 18 is fully seated into the seat ring 16, the liquid coolant flow completely terminates and the valve is closed. As illustrated in FIG. 5, the top of the valve seat 18 has a seat ring shoulder 18*a* that compliments plug shoulder 19*a*. Consequently, when the valve is in the closed position (seated) position the seat ring shoulder 18*a* and the plug shoulder 19*a* are in contact one another producing a tight seal.

In the above described closed position, the desuperheater application of the present invention provides minimal or no leakage. For example, to obtain class V status, as defined by ANSI/FCI classification, the leakage permitted is limited to 5×10 ml per minute per inch of orifice diameter per p.s.i. differential. Moreover, the valve must operate with a pressure differential of 50 p.s.i. at 125° Fahrenheit.

Figure 6:
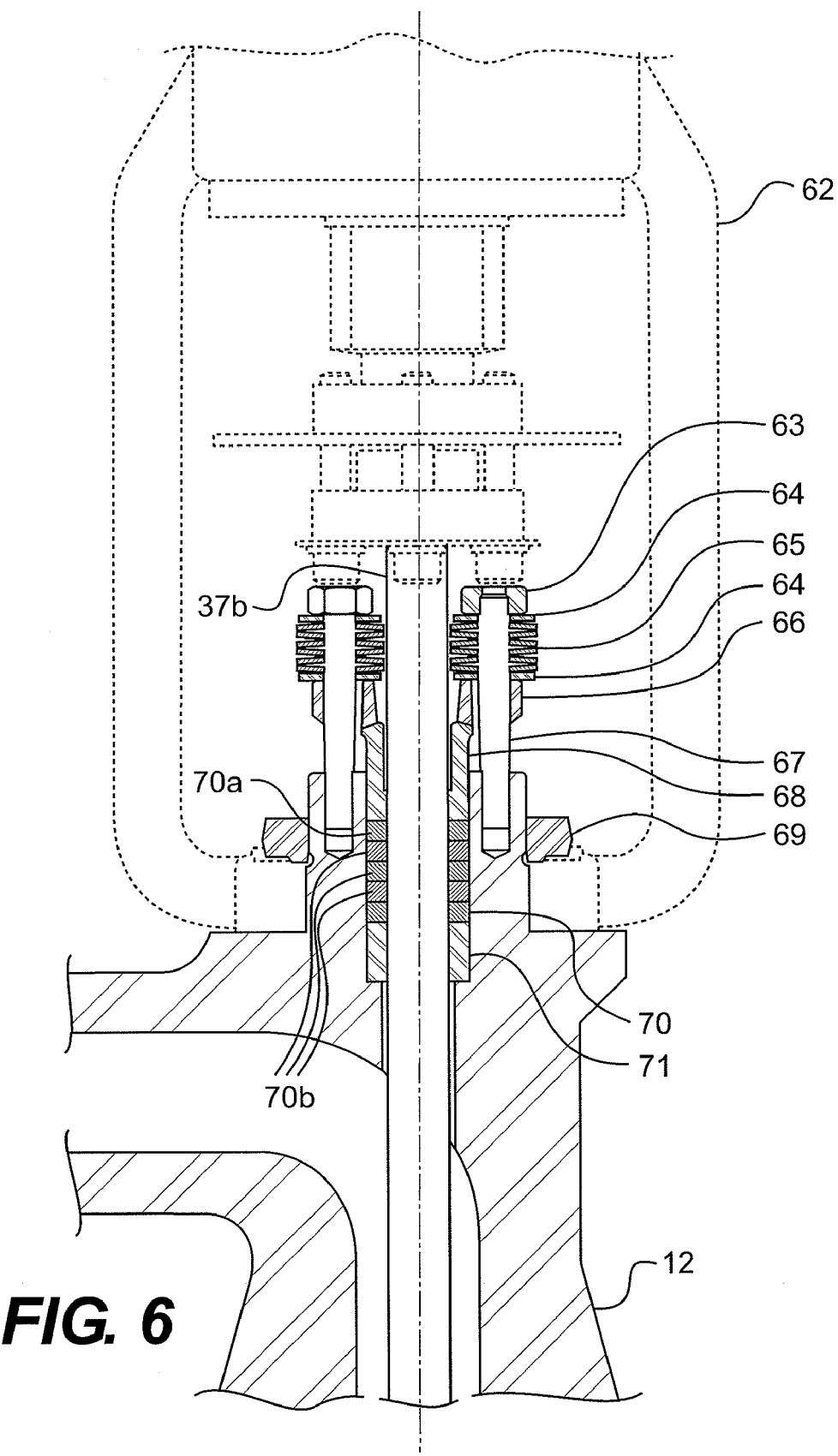
FIG. 6 is a cross sectional view showing an example of a stuffing box utilized in an embodiment of the present invention.

Referring to FIG. 6, when operating the MADV apparatus unit 10, there is a need to transfer longitudinal motion from the pneumatic valve actuator 36 to the valve's plug 18. However, due to the above-described design of the MADV apparatus unit 10, this transfer is carried out through the body of the valve containing a liquid at a pressure. Accordingly, embodiments of the present invention may utilize a stuffing box to prevent the likelihood of leakage of the cooling fluid between sliding parts of the valve stem 37*b*. A stuffing box may be a gland seal or the like, used to seal a rotating or reciprocating shaft against a fluid.

FIG. 6 illustrates a live loaded stuffing box in accordance with an embodiment of the present invention is depicted. As illustrated, the stuffing box is affixed to the main body 12. The stuffing box 62 includes an extended length guide bushing 71 which provides better guidance for the valve stem 37*b*. The stuffing box 62 further includes a first layer of braided graphite packing 70*a*, followed by three layers of spring graphite packing 70*b* and an additional layer of braided graphite packing 70*a*, disposed above the quite bushing 71. A compression ring 68 holds the aforementioned packing layers in place. While a compression ring positioner 66 retains the compression ring 68 in place. A first washer 64 is placed above the compression ring positioner 66 which has a bolt 63 in its center. On the other side of the first washer 64, six shoulder spring discs 65 are placed forming the live load three concave shaped module. A second washer 64 is placed on top of the six shoulder spring discs 65 and the assembly is held in place with bolt 63.

As illustrated in FIG. 6, the first layer and last layer of braided graphite packing 70*a* along with the three layers of spring graphite packing 70*b* are compressed against the main body 12 and the valve stem 37*b* forming a water tight seal. This picking and resulting seal allow the valve stem 37*b* to move up and down. Other packing schemas may also be employed without taking away from the spirit of the invention. For example, the spring type packing material me be substituted with PTFE or any other low friction durable material.

During operation, the stuffing box may be exposed to extreme temperature variations and vibration forces. After time, the bolts holding the packing together would eventually come loose and effect the performance of the packing. A first solution would have a technician perform periodic inspection and adjust the bolts back into a predetermined torque value. An alternative to prevent the bolts from coming loose in the first place and is achieved through live loading stuffing box. Live loading is achieved through use of the six shoulder spring discs 65 which help absorb the vibrations and compensate for the temperature variations. The present invention may be utilized without live loading, but as stated above, it would require periodic maintenance.

What is claimed:

1. A valve assembly for desuperheating a gas or a liquid having a longitudinal axis extending therethrough, comprising:
   a valve body having an inlet and an outlet, where a channel extends there between, wherein said valve body is connected to a fluid conduit through which the gas or liquid to be desuperheated gas or liquid flows;
   an actuator connected to said valve body; wherein said actuator comprises a transversable actuator rod that extends into said channel of said valve body, wherein said transversable actuator rod extends into the channel only and not the fluid conduit;
   a valve seat disposed proximate to said outlet within said channel;
   a plug disposed within said channel and attached to said transversable actuator rod, wherein said transversable actuator rod translates said plug within said channel;
   a spray tube coupled to the outlet of said valve; and
   at least one spray head affixed to said spray tube.

2. The valve assembly according to claim 1, wherein said channel comprises:
   a first section extending from said inlet that extends generally normal to the longitudinal axis; and
   a second section extends from said outlet that extends generally parallel to the longitudinal axis.

3. The valve assembly according to claim 1, wherein the at least one spray head is disposed within a conduit through which the gas or liquid to be desuperheated flows.

4. The valve assembly according to claim 3, further comprises:
   a downstream sensor to monitor said gas or liquid proximate to said conduit; and
   a controller to receive said downstream sensor information; and
   an actuator control mechanism.

5. The valve assembly according to claim 1, wherein the at least one spray head further comprises:
   a fluid inlet and a spray outlet;
   a spring-loaded plunger retained in a cylindrical housing;

a plunger inserted into the spray outlet of said cylindrical housing;

a plunger stop attached to said cylindrical housing at said fluid inlet; and a spring retainer attached to said plunger.

6. The valve assembly according to claim 1, wherein said actuator is a pneumatically operated.

7. The actuator of claim 1, wherein the actuator is electrically operated, hydraulically operated or manually operated.

8. The valve assembly according to claim 1, wherein said valve seat further comprises a conical geometry having its minor frustrum extending into said outlet and a first planar shoulder ring positioned on said valve seat having a surface at an angle relative to the longitudinal axis.

9. The valve assembly according to claim 1, wherein said plug has a conical geometry and further comprises a second planar shoulder ring positioned on said plug having a surface extending at said angle relative to the longitudinal axis, wherein said plug and valve seat provide a sealing engagement.

10. The valve assembly according to claim 1, wherein said plug and said valve seat have generally conical geometries to permit algebraic dampening of the flow of cooling liquid through said valve assembly based upon said plug's proximate position to the valve seat.

11. The valve assembly according to claim 1, further comprising a stuffing box positioned between said actuator and said channel, wherein said stuffing box permits translation of said transversable actuator rod.

12. The valve assembly according to claim 1, wherein said plug, said valve seat and valve body are seat are constructed from one of the following: 420 Stainless Steel, carbon steel, Stellite (cobalt-chromium alloys), brass, beryllium-copper or any heat durable corrosion resistant metal or alloy.

13. The valve assembly according to claim 1, wherein the inlet and outlet have flange connections.

14. A valve assembly for desuperheating a gas or a liquid having a longitudinal axis extending therethrough, comprising:

a valve body having an inlet and an outlet, where a channel extends there between wherein said valve body is connected to a fluid conduit through which the gas or liquid to be desuperheated gas or liquid flows;

a valve seat disposed proximate to said outlet within said channel; and a plug disposed within said channel and attached to a transversable actuator rod, wherein said transversable actuator rod translates said plug within said channel, wherein said transversable actuator rod extends into the channel only and not the fluid conduit.

15. A method for desuperheating a gas or a liquid utilizing a valve assembly, comprising:

detecting a first temperature of said gas or liquid to be desuperheated;

sending said detected temperature to a controller;

sending a control signal to a valve actuator coupled to a valve, wherein said valve comprises:

a valve body having an inlet and an outlet, where a channel extends there between wherein said valve body is connected to a fluid conduit through which the gas or liquid to be desuperheated gas or liquid flows;

a valve seat disposed proximate to said outlet within said channel; and a plug disposed within said channel and attached to a transversable actuator rod wherein said transversable actuator rod extends into the channel only and not the fluid conduit, wherein said transversable actuator rod translates said plug within said channel; and positioning said plug proximate to the valve seat in response to the signal.

16. The method of claim 15, further comprising:

detecting a second temperatures of said gas or liquid to be desuperheated;

sending second temperature detections to said controller;

sending second temperature signals to said valve actuator coupled to said valve;

positioning said plug proximate to the valve seat in response to the second control signals.

17. The method of claim 15, wherein the valve further comprises at least one spray nozzle disposed within a conduit through which the gas or liquid to be desuperheated flows.

18. The method of claim 15, wherein said actuator is a pneumatic actuator.

19. The method of claim 15, wherein the plug and the valve seat have a conical geometry.

* * * * *